United States Patent Office 2,891,855
Patented June 23, 1959

2,891,855
COMPOSITIONS AND METHODS FOR INFLUENCING THE GROWTH OF PLANTS

Hans Gysin, Basel, and Enrico Knüsli, Riehen, near Basel, Switzerland, assignors to J. R. Geigy A.G., Basel, Switzerland, a Swiss firm No Drawing. Application January 12, 1955
Serial No. 481,474

Claims priority, application Switzerland August 16, 1954

15 Claims. (Cl. 71—2.5)

The present invention is concerned with new compositions for influencing, and more particularly, inhibiting the growth of plants and with the methods of applying these compositions for influencing the growth of plants.

The surprising observation has been made that diamino-chloro-s-triazines of the general formula:

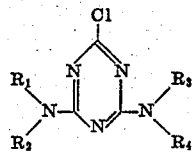

wherein $R_1$, $R_2$, $R_3$ and $R_4$ are hydrogen, alkyl, alkenyl, hydroxyalkyl, aralkyl or cycloalkyl radicals whilst the alkyl pairs $R_1$ and $R_2$ and also $R_3$ and $R_4$ can be bound to each other either direct or by way of a hetero atom, in even very low concentrations have an inhibitory influence on the growth of plants or have a lethal action.

Compounds of the general formula defined above are obtained easily, for example from cyanuric chloride and ammonia, primary or secondary amines. They are excellently suitable as active ingredients for weed killers, both for the killing of weeds among cultivated plants (selective herbicides) as well as for the total elimination or inhibition of undesired plant growth (overall toxic herbicides). The word "weeds" here also means undesired cultivated plants, e.g. those which have been previously planted or those which are planted in neighboring areas. In addition, the diamino-chloro-s-triazines as defined above also exert other inhibitory influences on the plant growth and may be used for example, for defoliation, acceleration of ripeness by desiccation, e.g. of potato plants, also blossom thinning, retardation of blossoming, prolongation of the harvesting period and storing propensities. Further, the term "inhibitory influences" also comprises the compensation of conditions which otherwise occasionally stimulate plant growth in an unwanted direction, e.g. high temperature or rich fertilisation, so avoiding poor yields or poor quality of the desired agricultural or horticultural product from plants which are well developed in other regards.

The following diamino-chloro-s-triazines can be used as active ingredients; some (A) are known, and others (B) are new:

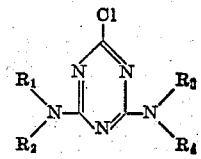

(A)

| $R_1$ | $R_2$ | $R_3$ | $R_4$ |
|---|---|---|---|
| H | H | H | H |
| $CH_3$ | H | $CH_3$ | H |
| $C_2H_5$ | H | $C_2H_5$ | H |
| $CH_2=CH-CH_2$ | H | $CH_2=CH-CH_2$ | H |
| $HO-CH_2-CH_2$ | H | $HO-CH_2-CH_2$ | H |
| $-C_6H_5-$ | H | $-C_6H_5-$ | $CH_3$ |
| $C_2H_5$ | $C_2H_5$ | $C_2H_5$ | $C_2H_5$ |
| $CH_2=CH-CH_2$ | $CH_2=CH-CH_2$ | $CH_2=CH-CH_2$ | $CH_2=CH-CH_2$ |
| $HO-CH_2-CH_2$ | $HO-CH_2-CH_2$ | $HO-CH_2-CH_2$ | $HO-CH_2-CH_2$ |
| $-CH_2CH_2CH_2CH_2CH_2-$ | | $-CH_2CH_2CH_2CH_2CH_2-$ | |
| $-CH_2CH_2OCH_2CH_2-$ | | $-CH_2CH_2OCH_2CH_2-$ | |
| H | H | $CH_3$ | H |
| H | H | $C_2H_5$ | H |
| H | H | $C_3H_7$ | H |
| H | H | $CH_2=CH-CH_2$ | H |
| H | H | $HO-CH_2-CH_2$ | H |
| H | H | $CH_3$ | $CH_3$ |
| H | H | $C_2H_5$ | $C_2H_5$ |
| H | H | $CH_2=CH-CH_2$ | $CH_2=CH-CH_2$ |
| H | H | $C_2H_5$ | H |
| $CH_3$ | H | $CH_3$ | $CH_3$ |
| $CH_3$ | H | $CH_3$ | $CH_3$ |
| $C_2H_5$ | H | $C_2H_5$ | $C_2H_5$ |

(B)

| R₁ | R₂ | R₃ | R₄ | |
|---|---|---|---|---|
| $C_3H_7$ | H | $C_3H_7$ | H | M.P. 210.5–212° |
| ⬡–$CH_2$ | H | ⬡–$CH_2$ | H | M.P. 238–240° |
| $CH_3$ | $C_4H_9$ | $CH_3$ | $C_4H_9$ | B.P.$_{0.004}$ 111° |
| $C_3H_7$ | $C_3H_7$ | $C_3H_7$ | $C_3H_7$ | B.P.$_{0.25}$ 134–136° |
| i-$C_3H_7$ | i-$C_3H_7$ | i-$C_3H_7$ | i-$C_3H_7$ | M.P. 111–112° |
| $CH_3$ | HO–$CH_2CH_2$ | $CH_3$ | HO–$CH_2CH_2$ | M.P. 94.5–97° |
| H | H | $C_3H_7$ | $C_3H_7$ | M.P. 144–146.5° |
| $CH_3$ | H | $C_2H_5$ | $C_2H_5$ | M.P. 144–146.5° |
| $C_3H_7$ | H | $C_2H_5$ | $C_2H_5$ | M.P. 112–114° |
| $CH_3$ | $CH_3$ | $C_2H_5$ | $C_2H_5$ | B.P.$_{0.004}$ 100° |
| $C_2H_5$ | $C_2H_5$ | HO–$CH_2CH_2$ | H | M.P. 92–94° |
| $C_2H_5$ | $C_2H_5$ | $C_3H_7$ | $C_3H_7$ | B.P.$_{0.003}$ 112° |
| $C_4H_9$ | $C_4H_9$ | $C_4H_9$ | $C_4H_9$ | B.P.$_{0.002}$ 124° |
| $C_3H_5$ | H | $CH_3$ | $CH_3$ | M.P. 152–154.5° |
| $C_3H_7$ | $C_3H_7$ | $CH_3$ | $CH_3$ | B.P.$_{0.0015}$ 98–101° |
| $C_4H_9$ | H | $C_4H_9$ | H | M.P. 207.5–209° |
| $C_3H_7$ | H | $CH_3$ | $CH_3$ | M.P. 146.5–148.5° |
| HO–$CH_2CH_2$ | H | $CH_3$ | $CH_3$ | M.P. 143–144° |
| $CH_3$ | H | $C_2H_7$ | H | M.P. 203.5–204.5° |
| $CH_3$ | H | HO–$CH_2CH_2$ | | M.P. 180–181° on decomposition |
| $CH_3$ | H | $C_3H_7$ | $C_3H_7$ | M.P. 134.5–136° |
| $C_2H_5$ | H | $C_3H_7$ | H | M.P. 200–202° |
| $C_2H_5$ | H | $C_3H_7$ | $C_3H_7$ | M.P. 103.5–105.5° |
| $C_2H_5$ | H | HO–$CH_2CH_2$ | | M.P. 178–179° on decomposition |
| H | H | ⬡–H | $CH_3$ | M.P. 149–150° |
| $C_2H_5$ | H | ⬡–OH | $CH_3$ | M.P. 126–128° |

Typical examples for the production of such compounds are given below. (Parts are always given below as parts by weight.)

(A) 2-CHLORO-4,6-BIS-(METHYLBUTYL-AMINO)-S-TRIAZINE 31 parts of cyanuric chloride are dissolved in 80 parts of acetone and this solution is poured into 100 parts of ice water. First 30 parts of methylbutylamine and then 28 parts of sodium bicarbonate in 40 parts of water are then added dropwise while stirring at 0–5° C. The temperature is brought to 50° C. within one hour, then the reaction product is cooled to room temperature and the oily reaction product is extracted with benzene.

By distillation, 38.5 parts of 2-chloro-4,6-bis-(methylbutylamino)-s-triazine which boils at 111° under 0.004 mm. Hg, are obtained. If di-isopropylamine is used, it is advantageous to perform the reaction in boiling dioxan under which conditions the analogous chlorotriazine compound is obtained.

(B) 2-CHLORO-4-METHYLAMINO-6-DIETHYL-AMINO-S-TRIAZINE 44 parts of 2,4-dichloro-6-diethylamino-s-triazine are dissolved in 100 parts of acetone and distributed as finely as possible by pouring into 200 parts of ice-water. 13 parts of methylamine in 40 parts of water are then added dropwise at 10–15° C. and the whole is stirred for one hour at room temperature. Filtration of the crystalline precipitate gives a practically quantitative yield of the raw 2 - chloro - 4 -methylamino - 6 - diethylamino - s- triazine. By recrystallisation from ethanol, long white needles which melt at 144–146.5° are obtained.

The plant growth influencing compositions according to the present invention are either solutions, emulsions, suspensions or dusts according to the intended use. All application forms however, must contain the active substance in fine distribution. In particular, when total destruction of plant growth, premature desiccation or defoliation are desired, the effect can be increased by the use of carriers which are phytotoxic themselves such as, e.g. high boiling mineral oils or chlorohydrocarbons. On the other hand, under certain circumstances the selective inhibition of plant growth, e.g. selective weed killing, can be more clearly attained by the use of indifferent carriers.

For example, mineral oil fractions such as kerosene or diesel oil or coal tar oils and oils of vegetable or animal origin can be used as solvents for solutions which can be sprayed direct on to the plants. The active ingredients according to this invention are added to such oils direct or with the use of suitable auxiliary solvents such as xylene. Solutions in lower boiling or also in more expensive solvents such as alcohols, e.g. ethyl or isopropyl alcohol, ketones such as, e.g. acetone or cyclohexanone, hydrocarbons, e.g. benzene, toluene, xylene, tetrahydronaphthalene or alkylated naphthalenes and chlorinated hydrocarbons such as tetrachlorethane or ethylene chloride are less suitable for direct application but can be used for combinations with suitable emulsifiers for the production of concentrates which can be worked up for aqueous emulsions.

Aqueous application forms are made from emulsion and dispersion concentrates by adding water. The substances as such or dissolved in one of the above named solvents, are homogeneously incorporated into water, preferably by means of surface active agents such as wetting or dispersing agents. Examples of cation active emulsifiers or dispersing agents are quaternary ammonium compounds, examples of anion active emulsifying agents are soap, soft soap, long chained aliphatic sulphuric acid monoesters, araliphatic sulphonic acids, long chained alkoxyacetic acids and examples of non-ionic emulsifiers are polyethylene glycol ethers of fatty alcohols and polyethylene oxide condensation products. Also, concentrates can be produced consisting of active substance, emulsifier or dispersing agent, and, if necessary, solvent. These latter are suitable for dilution wtih water.

Dusts can be produced by mixing or blending active substance with a solid carrier. Examples of such are: talcum, diatomaceous earth, kaolin, bentonite, calcium carbonate, boric acid, tricalcium phosphate or also sawdust, powdered cork, charcoal and other materials of vegetable origin. On the other hand, the carriers can be impregnated by means of a volatile solvent. Dusts and pastes can be suspended in water by the addition of wetting agents and protective colloids and so used as spraying agents.

As there exist both liquid and solid active compounds of almost the same herbicidal activity, both liquid concentrates for aqueous emulsions and wettable concentrates for aqueous suspensions with a high concentration of the active ingredient can easily be prepared. The various forms of application can be adapted to the intended use in the usual way by the addition of substances which improve the distribution, the adhesive properties, resistance to rain, and, possibly, the resorption. Such substances are: e.g. fatty acids, resins, wetting agents, glue, casein or alginates. In the same way, the biological activity can be increased or amplified by the addition of substances which have a bactericidal or fungicidal action or of substances which also influence the growth of plants, as well as by combination with fertilisers.

In the following, examples for typical application agents and application forms are given (Examples 1 to 4).

To illustrate the range of application mentioned in the description, some chosen examples of laboratory and field tests and the results obtained are also given (Examples 5–11).

Example 1

20 parts of 2-chloro-4,6-bis-ethylamino-s-triazine and 80 parts of talcum are ground in a small mill to the greatest degree of fineness. The powder thus obtained can be used as a dust.

Example 2

20 parts of 2-chloro-4,6-bis-diethylamino-s-triazine or of 2-chloro-4-ethylamino-6-diethylamino-s-triazine are dissolved in a mixture of 48 parts of diacetonalcohol, 16 parts of xylene and 16 parts of an anhydrous high molecular condensation product of ethylenoxide with high fatty acids. This concentrate can be diluted with water to give emulsions of any concentration desired.

Example 3

80 parts of 2-chloro-4,6-bis-ethylamino-s-triazine or 80 parts of 2-chloro-4-ethylamino-6-diethylamino-s-triazine are mixed with 2–4 parts of a wetting agent, e.g. a sulphuric acid ester of an alkyl polyglycol ether, 1–3 parts by weight of a protective colloid, e.g. sulphite waste liquor and 15 parts of an inert solid carrier such as e.g. kaolin, bentonite, chalk or kieselguhr. The mixture is then ground very finely in a suitable mill. The powder obtained can be added to water and gives a suspension which is very stable.

Example 4

10 parts of 2-chloro-4,6-bis-diethylamino-s-triazine are dissolved in 90 parts of trichlorethylene or in high boiling organic solvent such as coal tar oil, diesel oil, spindle oil or aromatic solvent.

Example 5

30 grains of oats, 30 grains of mustard and 30 grains of cucumber were sown in flats which were filled 5 cm. high with screened earth prepared in the following way. 100 mg. of active substance, evenly distributed into 1 g. of talcum powder are incorporated into 1 litre of earth homogeneously. Within 20 days, the seedlings of all three test plants were destroyed when the following substances were used as active ingredients:

(a) 2-chloro-4-amino-6-ethylamino-s-triazine,
(b) 2-chloro-4-amino-6-n-propylamino-s-triazine,
(c) 2-chloro-4-amino-6-n-butylamino-s-triazine,
(d) 2-chloro-4-amino-6-allylamino-s-triazine,
(e) 2-chloro-4-amino-6-diethylamino-s-triazine,
(f) 2-chloro-4-methylamino-6-ethylamino-s-triazine,
(g) 2-chloro-4-methylamino-6-n-propylamino-s-triazine,
(h) 2-chloro-4,6-bis-ethylamino-s-triazine,
(i) 2-chloro-4-ethylamino-6-n-propylamino-s-triazine,
(j) 2-chloro-4-ethylamino-6-($\beta$-hydroxy-ethylamino)-s-triazine,
(k) 2-chloro-4-ethylamino-6-diethylamino-s-triazine.

Example 6

When tested exactly in the same way as described in Example 5, 2-chloro-4,6-bis-($\beta$-hydroxy-ethylamino)-s-triazine destroyed the seedlings of oats and mustard but did not have an influence on the cucumber seedlings.

2-chloro-4-ethylamino-6-dimethylamino-s-triazine only destroyed the seedlings of oats, whereas 2-chloro-4-methylamino-6-($\beta$-hydroxyethylamino)-s-triazine and 2-chloro-4-methylamino-6-dimethylamino-s-triazine only destroyed the seedlings of mustard.

Example 7

A dust containing 10% of 2-chloro-4,6-bis-diethylamino-s-triazine and talcum as a carrier applied to 3–4 week old cotton plants caused severe leaf burn within 1–3 days after application. 2-chloro-4,6-bis-diallylamino-s-triazine and 2-chloro-4-dimethylamino-6-diethylamino-s-triazine had similar effects.

Example 8

2-chloro-4,6-bis-diethylamino-s-triazine was applied at a rate of 1.8 g. per square metre as a 1.6% aqueous emulsion equivalent to 16 lbs. per acre in 100 gallons of water, to flats containing a loam high in organic matter and which had been seeded 24 hours previously with lima beans, cotton, rye grass, purslane and crab grass. After 7 days, the germination of lima beans was 98.7% and the germination of cotton 92.9% compared with the untreated flats. After 28 days, the cotton seedlings in treated flats had grown exactly as the controls and the lima bean plants in the treated flats were only very slightly inhibited. On the other hand, a 100% destruction of rye grass and purslane, and a 97.7% destruction of crab grass was observed in the treated flats.

Example 9

A pre-emergence field test on cotton consisted of applying 2-chloro-4,6-bis-diethylamino-s-triazine to cotton at the time of planting at a rate of 2, 4, 6, 8, 10, 12, 18 and 24 lbs. per acre, emulsified in 80 gallons of water. Four replications were used for each concentration, each replication consisting of 2 rows being 20 ft. long. Stand counts were made 4 weeks after treatment and showed that the growth at all rates was normal and no injury of any kind was evident. Weed counts were made 4 and 8½ weeks after treatment and the results are given in the following table:

| Treatment | 4 weeks after treatment | | 8½ weeks after treatment | |
|---|---|---|---|---|
| | Weeds per sq. ft. | Percent destruction | Weeds per sq. ft. | Percent destruction |
| 2 lbs | 10.2 | 57 | 13.1 | 55 |
| 4 lbs | 7.2 | 69 | 10.2 | 67 |
| 6 lbs | 2.9 | 87 | 9.4 | 70 |
| 8 lbs | 2.6 | 89 | 5.2 | 83 |
| 10 lbs | 2.2 | 90 | 5.4 | 83 |
| 12 lbs | 2.0 | 91 | 3.2 | 89 |
| 18 lbs | 0.8 | 96 | 1.8 | 94 |
| 24 lbs | 0.9 | 96 | 1.4 | 94 |
| Untreated | 23.8 | | 31.8 | |

The main weeds were panic grass and chickweed but narrow leaf plantain and wild carrot were also present.

Example 10

As a post-emergence stem spray, 2-chloro-4,6-bis-diethylamino-s-triazine was applied to cotton (8–10" tall), corn (12–14" tall) and beans (10–12" tall) at a rate of 12 lbs. per acre emulsified in 40 gallons of water. Three replications were used for each plant and each replication was one row being 20 ft. long. A four inch band on each side of the row was sprayed with the nozzles overlapping approximately 1½" up the plant stem. Weeds present were panic grass, rag weed, chick weed, narrow leaf plantain, nut grass and purslane and all were well established as no cultivation had taken place from the time of planting 4 weeks earlier.

Growth ratings and observations showed that the growth of cotton and corn was normal and that the growth of beans was reduced slightly, with no injury of any kind to any of the crops.

Weed counts 3 and 5 weeks after treatment showed that control ranged from 87–97%.

*Example 11*

The herbicidal action was tested on a garden path well established with weeds which path had not been weeded mechanically for one year. Two active ingredients, 2-chloro-4-ethylamino-6-diethylamino-s-triazine (I) and 2-chloro-4,6-bis-ethylamino-s-triazine (II) according to the present invention were used in amounts of 1, 0.5 and 0.2 g. per square metre. The path was divided into areas of 7.5 square metres for the respective concentrations and compounds. Application was made in the middle of August by spraying of suspensions of corresponding concentrations in 1 litre of water per square metre. The types of weeds were, in particular rye grass (Lolium species) as well as some further undetermined grasses, dandelions (*Taraxacum officinalis*) and plantain (*Plantago media*). Numerous young plants of the two latter were already in development and germination took place continuously. On controlling the weeds 25 days after application, the following effect on the weeds was found:

a plant in an amount sufficient to inhibit plant growth, a compound of the formula:

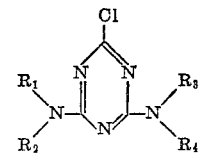

wherein $R_1$, $R_2$, $R_3$ and $R_4$ each represents a member selected from the group consisting of hydrogen, alkyl, alkenyl, hydroxyalkyl, aralkyl and cycloalkyl radicals and each of the pairs of radicals $R_1$ and $R_2$, and $R_3$ and $R_4$ together with the corresponding nitrogen atom represents a member selected from the group consisting of five to six-membered alkylenimino radicals and the morpholino radical.

3. A method of desiccating cultivated plants which comprises bringing into contact with at least an aerial part of the plant in an amount sufficient to cause desiccation, a compound of the formula

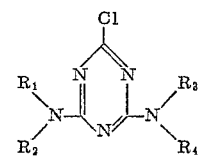

wherein $R_1$, $R_2$, $R_3$ and $R_4$ each represents a member selected from the group consisting of hydrogen, alkyl, alkenyl, hydroxyalkyl, aralkyl and cycloalkyl radicals and each of the pairs of radicals $R_1$ and $R_2$, and $R_3$ and $R_4$ together with the corresponding nitrogen atom represents a member selected from the group consisting of five to six-membered alkylenimino radicals and the morpholino radical.

TABLE

| Product | Concentration, g./sq. m. | Lolium | Other grasses | Plantago | Taraxacum |
|---|---|---|---|---|---|
| I | 1 | strongly damaged, only single green leaves left. | dead | dead | old plants only slightly affected. No young plants present. |
| | 0.5 | some slightly, some seriously damaged, a few plants dead. | ...do | some seriously damaged, some dead. | old plants only slightly affected. Some young plants present. |
| | 0.2 | practically normal, some slightly damaged. | ...do | considerably damaged | old plants normal, many young plants present. |
| II | 1 | dead | ...do | dead | not present. |
| | 0.5 | some dead, some with green leaves. | ...do | ...do | Do. |
| | 0.2 | plants seriously damaged but not dead. | ...do | some dead, some seriously damaged. | old plants normal, but no young plants present. |

What we claim is:

1. A method of inhibiting the growth of plants which comprises bringing into contact with at least a part of a plant, an agricultural composition comprising a compound of the formula:

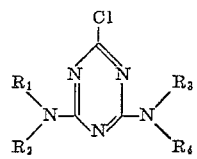

wherein $R_1$, $R_2$, $R_3$ and $R_4$ each represents a member selected from the group consisting of hydrogen, alkyl, alkenyl, hydroxyalkyl, aralkyl and cycloalkyl radicals and each of the pairs of radicals $R_1$ and $R_2$, and $R_3$ and $R_4$ together with the corresponding nitrogen atom represents a member selected from the group consisting of five to six-membered alkylenimino radicals and the morpholino radical, in a concentration sufficient to inhibit plant growth.

2. A method of inhibiting the growth of plants which comprises bringing into contact with at least a part of 4. A method of defoliating cultivated plants which comprises bringing into contact with at least an aerial part of the plant in an amount sufficient to cause defoliation, a compound of the formula

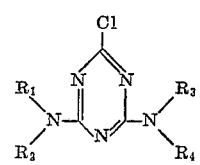

wherein $R_1$, $R_2$, $R_3$ and $R_4$ each represents a member selected from the group consisting of hydrogen, alkyl, alkenyl, hydroxyalkyl, aralkyl and cycloalkyl radicals and each of the pairs of radicals $R_1$ and $R_2$, and $R_3$ and $R_4$ together with the corresponding nitrogen atom represents a member selected from the group consisting of five to six-membered alkylenimino radicals and the morpholino radical.

5. A method of inhibiting weed growth which comprises bringing into contact with at least a part of the weed in an amount sufficient to inhibit weed growth, a compound of the formula

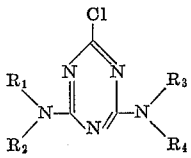

wherein $R_1$, $R_2$, $R_3$ and $R_4$ each represents a member selected from the group consisting of hydrogen, alkyl, alkenyl, hydroxyalkyl, aralkyl and cycloalkyl radicals and each of the pairs of radicals $R_1$ and $R_2$, and $R_3$ and $R_4$ together with the corresponding nitrogen atom represents a member selected from the group consisting of five to six-membered alkylenimino radicals and the morpholino radical.

6. A method of inhibiting the growth of plants which comprises bringing into contact with at least a part of a plant in an amount sufficient to inhibit plant growth, 2-chloro-4,6-bis-ethylamino-s-triazine.

7. A method of inhibiting the growth of plants which comprises bringing into contact with at least a part of a plant in an amount sufficient to inhibit plant growth, 2-chloro-4-ethylamino-6-diethylamino-s-triazine.

8. A method of inhibiting the growth of plants which comprises bringing into contact with at least a part of a plant in an amount sufficient to inhibit plant growth, 2-chloro-4,6-bis-diethylamino-s-triazine.

9. An agricultural composition comprising a compound of the formula

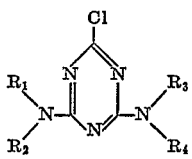

wherein $R_1$, $R_2$, $R_3$ and $R_4$ each severally represents a member selected from the group consisting of hydrogen, alkyl, alkenyl, hydroxyalkyl, aralkyl and cycloalkyl radicals, and each of the pairs of radicals $R_1$ and $R_2$, and $R_3$ and $R_4$, jointly and together with the corresponding nitrogen atom represents a member selected from the group consisting of five- to six-membered alkylenimino radicals and the morpholino radical, in a concentration sufficient to inhibit plant growth, and a water-insoluble solid, agricultural carrier which is non-reactive with the compound of the aforesaid formula.

10. An agricultural composition comprising a compound of the formula

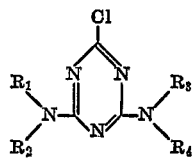

wherein $R_1$, $R_2$, $R_3$ and $R_4$ each severally represents a member selected from the group consisting of hydrogen, alkyl, alkenyl, hydroxyalkyl, aralkyl and cycloalkyl radicals, and each of the pairs of radicals $R_1$ and $R_2$, and $R_3$ and $R_4$, jointly and together with the corresponding nitrogen atom represents a member selected from the group consisting of five- to six-membered alkylenimino radicals and the morpholino radical, in a concentration sufficient to inhibit plant growth, and a surface active agent selected from the group consisting of quaternary ammonium compounds, soap, higher aliphatic sulphuric acid monoesters, polyethylene glycol ethers of fatty alcohols, polyethylene oxide condensation products and sulphite waste liquor, as an agricultural adjuvant which is non-reactive with the compound of the said formula.

11. An agricultural composition comprising a compound of the formula

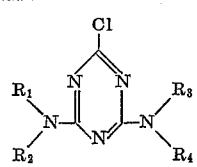

wherein $R_1$, $R_2$, $R_3$ and $R_4$ each severally represents a member selected from the group consisting of hydrogen, alkyl, alkenyl, hydroxyalkyl, aralkyl and cycloalkyl radicals, and each of the pairs of radicals $R_1$ and $R_2$, and $R_3$ and $R_4$, jointly and together with the corresponding nitrogen atom represents a member selected from the group consisting of five- to six-membered alkylenimino radicals and the morpholino radical, in a concentration sufficient to inhibit plant growth, and a member selected from the group consisting of coal tar oil, diesel oil, spindle oil and kerosene, as agricultural carrier which is non-reactive with the compound of the aforesaid formula.

12. A method of inhibiting the growth of plants which comprises bringing into contact with at least a part of a plant in an amount sufficient to inhibit plant growth, 2-chloro-6-propylamino-4-diethylamino-s-triazine.

13. A method of inhibiting the growth of plants which comprises bringing into contact with at least a part of a plant in an amount sufficient to inhibit plant growth, 2-chloro-4-propylamino-6-ethylamino-s-triazine.

14. An agricultural composition according to claim 10, wherein the first-mentioned compound is 2-chloro-4,6-bis-ethylamino-s-triazine.

15. An agricultural composition according to claim 11, wherein the first-mentioned compound is 2-chloro-4-ethylamino-6-diethylamino-s-triazine.

References Cited in the file of this patent

UNITED STATES PATENTS

| | | |
|---|---|---|
| 2,565,194 | Bacon | Aug. 21, 1951 |
| 2,658,893 | Roemer | Nov. 10, 1953 |
| 2,720,480 | Wolf | Oct. 11, 1955 |